United States Patent
Shu et al.

(10) Patent No.: US 11,356,362 B2
(45) Date of Patent: Jun. 7, 2022

(54) ADAPTIVE PACKET FLOW MONITORING IN SOFTWARE-DEFINED NETWORKING ENVIRONMENTS

(71) Applicant: VMware, Inc., Palo Alto, CA (US)

(72) Inventors: Ming Shu, Beijing (CN); Wenyu Zhang, Beijing (CN); Qiong Wang, Beijing (CN); Donghai Han, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/294,945

(22) Filed: Mar. 7, 2019

(65) Prior Publication Data

US 2020/0236037 A1 Jul. 23, 2020

(30) Foreign Application Priority Data

Jan. 21, 2019 (WO) ................ PCT/CN2019/072489

(51) Int. Cl.
*H04L 45/00* (2022.01)
*H04L 43/0894* (2022.01)
*H04L 47/283* (2022.01)
*G06F 9/455* (2018.01)
*H04L 45/64* (2022.01)

(52) U.S. Cl.
CPC .......... *H04L 45/38* (2013.01); *G06F 9/45558* (2013.01); *H04L 43/0894* (2013.01); *H04L 45/64* (2013.01); *H04L 47/283* (2013.01); *G06F 2009/45595* (2013.01)

(58) Field of Classification Search
CPC ..... G06F 2201/815; G06F 2009/45591; G06F 9/45558; G06F 11/3466; G06F 2009/4557; G06F 11/079; H04L 41/5096; H04L 43/50
See application file for complete search history.

(56) References Cited

U.S. PATENT DOCUMENTS

| 8,621,274 | B1* | 12/2013 | Forgette ................ G06F 11/203 714/10 |
| 8,892,982 | B2 | 11/2014 | Gardner |
| 2008/0291855 | A1* | 11/2008 | Bata .................. H04W 52/0219 370/311 |
| 2013/0024855 | A1* | 1/2013 | North .................. G06F 11/1484 718/1 |
| 2014/0201574 | A1* | 7/2014 | Manchek ............ G06F 11/2023 714/38.13 |

(Continued)

*Primary Examiner* — Hitesh Patel
(74) *Attorney, Agent, or Firm* — Su IP Consulting (57) ABSTRACT

Example methods and systems for a network management entity to perform adaptive packet flow monitoring. One example method may comprise receiving a request to monitor a packet flow between a first virtualized computing instance supported by a first host and a second virtualized computing instance supported by a second host. The method may also comprise activating a first set of checkpoints by instructing the first host and/or the second host to monitor the packet flow using the first set of checkpoints. The method may further comprise: in response to detecting a predetermined event based on first performance metric information associated with the packet flow, activating a second set of checkpoints by instructing the first host and/or the second host to monitor the packet flow using the second set of checkpoints.

18 Claims, 7 Drawing Sheets

(56) References Cited

U.S. PATENT DOCUMENTS

2015/0081943 A1* 3/2015 Larson ................ G06F 9/45558
710/264
2016/0020976 A1* 1/2016 Gamage .................. H04L 43/16
709/224
2016/0224898 A1* 8/2016 Ryckbosch ......... G06F 11/3409
2019/0386891 A1* 12/2019 Chitalia .............. H04L 43/0811

* cited by examiner

ADAPTIVE PACKET FLOW MONITORING IN SOFTWARE-DEFINED NETWORKING ENVIRONMENTS

CROSS-REFERENCE TO RELATED APPLICATION

The present application Ser. No. 16/294,945 claims the benefit of Patent Cooperation Treaty (PCT) Application No. PCT/CN2019/072489, filed Jan. 21, 2019, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc. In practice, packet flow monitoring may be performed to detect various issues affecting the performance of hosts and VMs in the SDN environment. However, in some cases, packet flow monitoring may effect on production traffic, which may have to compete with monitoring-related operations and traffic for resources.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to packet flow monitoring will now be explained in more detail using FIG. 1, which is a schematic diagram illustrating example software-defined networking (SDN) environment 100 in which adaptive packet flow monitoring may be performed. It should be understood that, depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136 (see also FIG. 2). Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, VMs 131-136 support respective applications 141-146 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM2 132 on host-B 110B may be connected to the same logical switch and located on the same logical layer-2 segment, such as a segment with VXLAN network identifier (VNI)=6000.

SDN manager 180 and SDN controller 184 are example network management entities in SDN environment 100. One example of an SDN controller is the NSX controller component of VMware NSX® (available from VMware, Inc.) that operates on a central control plane. SDN controller 184 may be a member of a controller cluster (not shown for simplicity) that is configurable using SDN manager 180 operating on a management plane. Network management entity 184/180 may be implemented using physical machine(s), VM(s), or both. Logical switches, logical routers, and logical overlay networks may be configured using SDN controller 184, SDN manager 180, etc. To send or receive control information, local control plane (LCP) agent 119A/119B/119C on host 110A/110B/110C may interact with central control plane (CCP) module 186 at SDN controller 184 via control-plane channel 101A/101B/101C.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc. Encapsulated packets may be sent via an end-to-end, bi-directional communication path (known as a tunnel) between a pair of VTEPs over physical network 104.

In practice, traffic among of VMs 131-136 may be affected by various performance issues in SDN environment 100. In this case, users (e.g., network administrators) usually have to identify the source(s) or origin(s) of these performance issues for network troubleshooting and debugging purposes. To facilitate troubleshooting, packet flow monitoring may be configured for a first packet flow (FLOW1) 191 between VMs 131-132. Similarly, packet flow monitoring may be configured for a second packet flow (FLOW2) 192 between VMs 133-134.

During packet flow monitoring, performance metric information may be collected to facilitate troubleshooting. Usually, extra CPU cycles are required to collect such metric information, such as when performing arithmetic operations to measure the latency associated with packet flow 191/192. Further, valuable network resources (that may be used for production traffic) are consumed to report the performance metric information. As SDN environment 100 increases in scale and complexity, the overhead associated with packet flow monitoring also increases. In this case, production traffic may have to compete with monitoring-related operations and traffic for resources.

Adaptive Monitoring

According to examples of the present disclosure, packet flow monitoring may be improved using an adaptive approach. Under normal operating conditions, a packet flow may be monitored using a first set of checkpoints. When a predetermined event (e.g., performance issue) is detected, a second set of checkpoints may be activated. This way, packet flow monitoring may be adapted dynamically according to the state or performance of the packet flow. For example, when there is no performance issue, the second set of checkpoints may be deactivated to reduce resource consumption and competition with production traffic. When there is a performance issue, however, additional checkpoints may be activated to facilitate troubleshooting.

Throughout the present disclosure, the term "checkpoint" (also known as "logical checkpoint" or "software-implemented checkpoint") may refer generally to a component located on a datapath along which a packet flow travels and where monitoring may be performed. For example in FIG. 2, checkpoints may include hypervisor-implemented components, such as VNICs 151-152, LPs 161-162, distributed firewall engines 171-172, uplink/downlink interfaces or ports, logical switches, logical routers, logical router ports, virtualized computing instances, etc. Depending on the desired implementation, packet flow monitoring "using" a checkpoint may involve performing an action (e.g., collecting performance metric information) in response to detecting a packet flow passing via the checkpoint. Performance metric information may be calculated using information collected by a single checkpoint or multiple checkpoints (e.g., latency).

Figure 1:
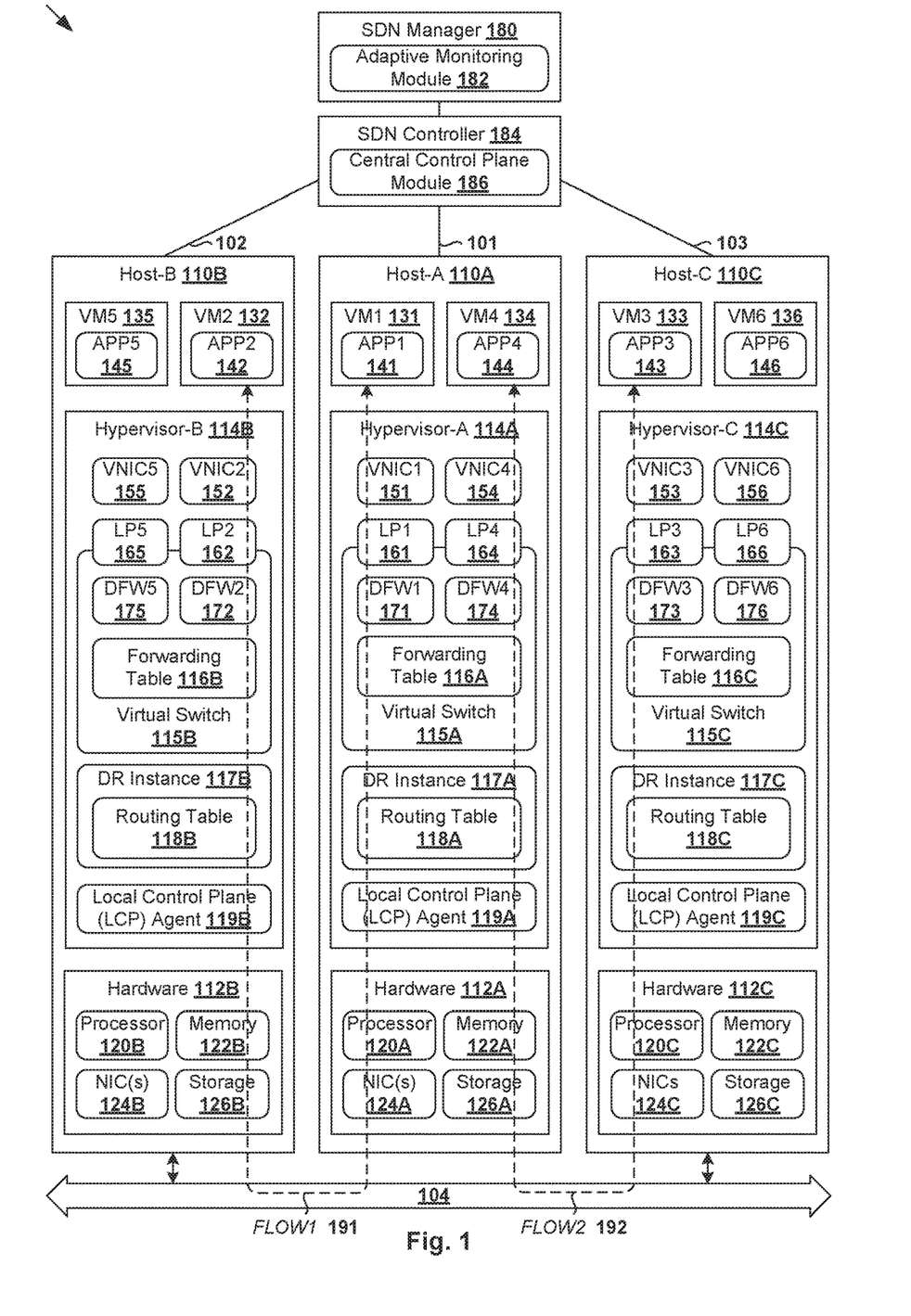
FIG. 1 is a schematic diagram illustrating an example software-defined networking (SDN) environment in which adaptive packet flow monitoring may be performed.
Figure 2:
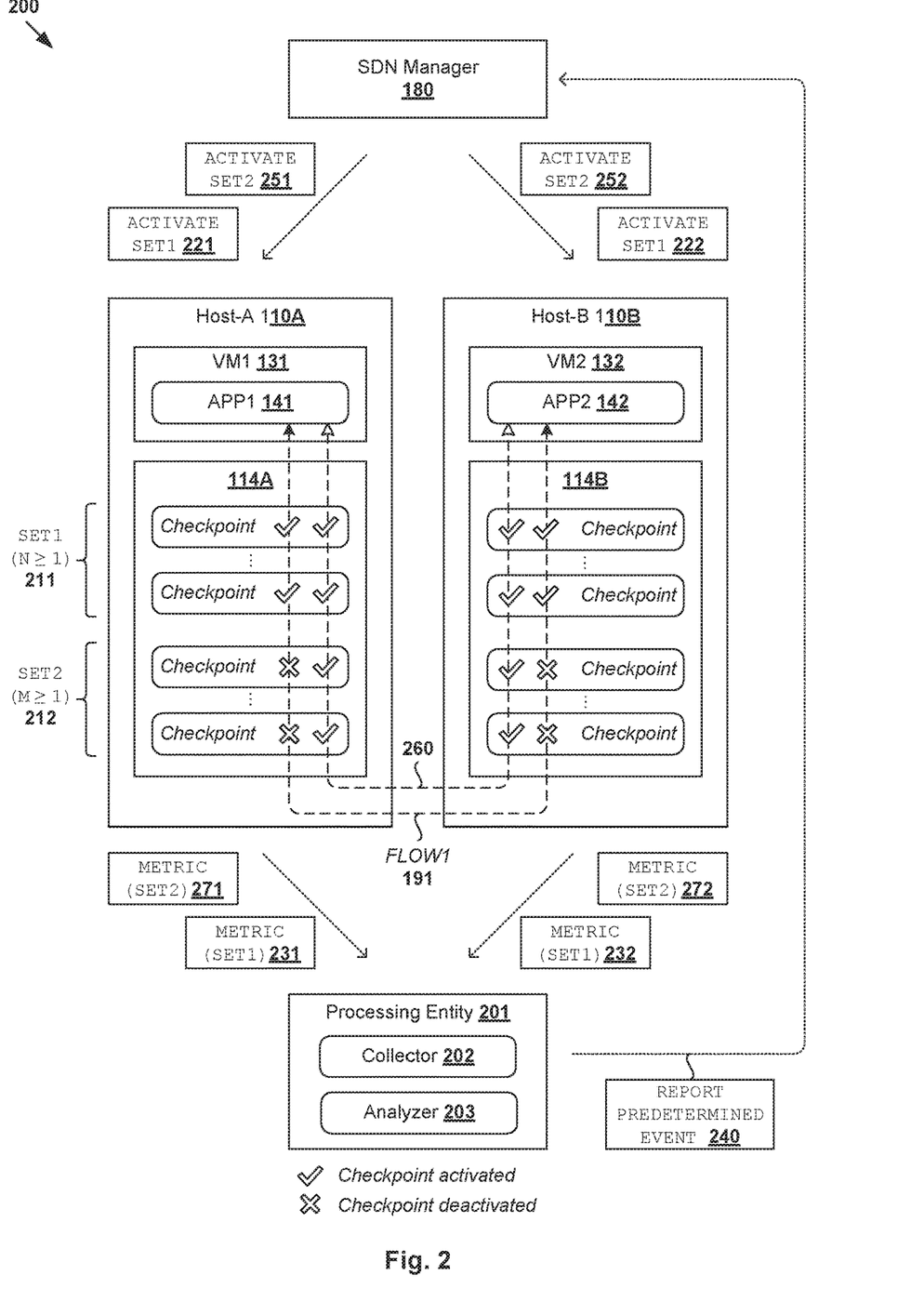
FIG. 2 is a schematic diagram illustrating example adaptive packet flow monitoring in the example in FIG. 1.

FIG. 2 is a schematic diagram illustrating example adaptive packet flow monitoring 200 in the example in FIG. 1. The example in FIG. 2 will be discussed using FIG. 3, which is a flowchart of example process 300 for a network management entity to perform adaptive packet flow monitoring in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In practice, example process 300 may be implemented using any suitable "network management entity," such as SDN manager 180 using adaptive monitoring module 182, SDN controller 184 using CCP module 186, etc. For simplicity, FLOW2 192 with host-C 110C is not shown in FIG. 2.

In the following, an example will be described using host-A 110A as a "first host," host-B 110B as a "second host," VM1 131 as a "first virtualized computing instance," and VM2 132 as "second virtualized computing instance." Although the terms "first" and "second" are used throughout the present disclosure to describe various elements, these elements should not be limited by these terms. These terms are used to distinguish one element from another. For example, a first element may be referred to as a second element, and vice versa. Any host may each perform the role of a "first host" or a "second host."

Figure 3:
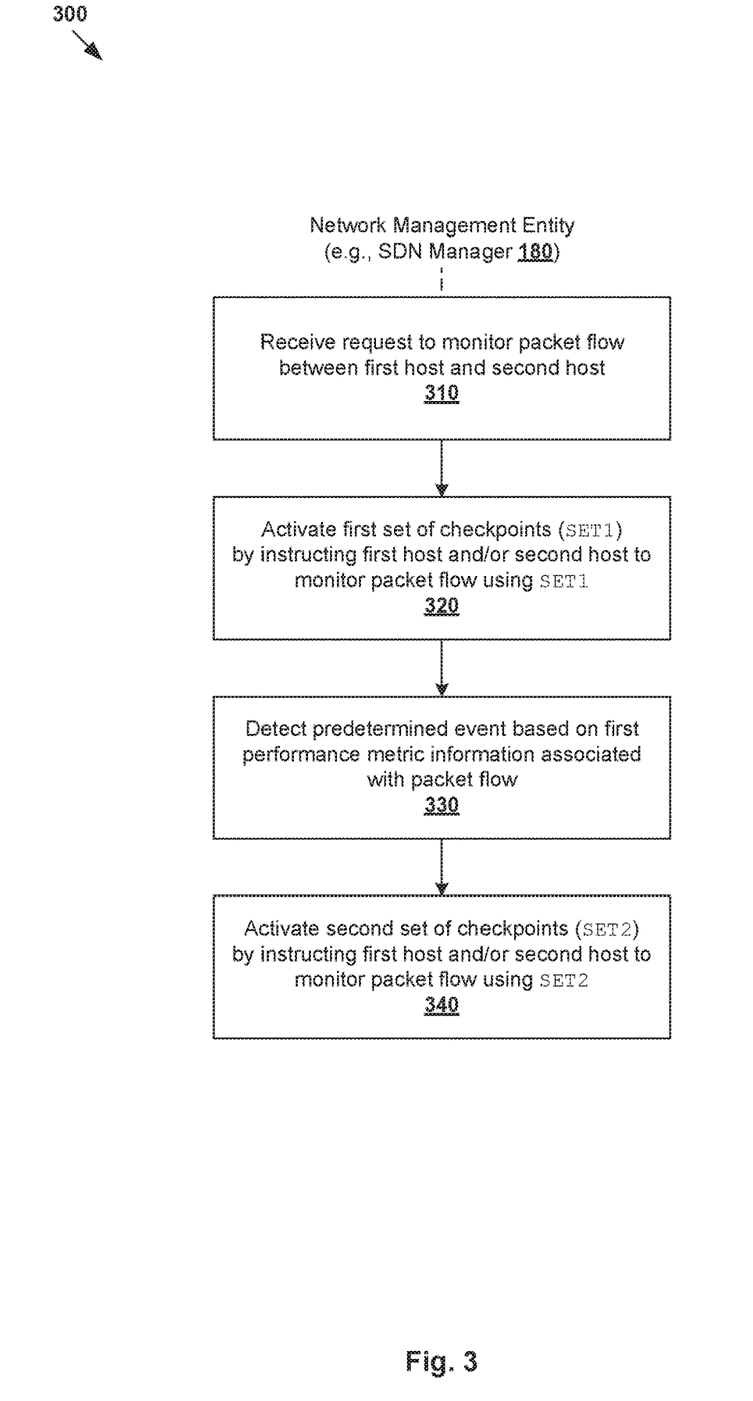
FIG. 3 is a flowchart of an example process for a network management entity to perform adaptive packet flow monitoring in an SDN environment.

At 310 in FIG. 3, SDN manager 180 may receive a request to monitor packet flow (FLOW1) 191 between APP1 141 of VM1 131 supported by host-A 110A and APP2 142 of VM2 132 supported by host-B 110B. For example, SDN manager 180 may receive a request from a user device (not shown) operated by a user (e.g., network administrator). The packet flow may be identified using any suitable information, such as application information, five-tuple information (e.g., source address, destination address, source port number (PN), destination PN, protocol), etc.

At 320 in FIG. 3, SDN manager 180 may activate a first set of checkpoints (see 211 in FIG. 2) by instructing host-A 110A and/or host-B 110B to monitor FLOW1 191 using the first set of checkpoints. As will be discussed further below, block 320 may involve generating and sending control information to cause host-A 110A (see 221) and/or host-B 110B (see 222) to collect first performance metric information associated with FLOW1 191. Any suitable "performance metric information" may be collected, such as latency, throughput, packet loss, packet size, jitter, number of transmitted or received units of data (bytes), number of packets transmitted or received, any combination thereof, etc. First set 211 may include any suitable number (N≥1) of checkpoints.

At 330 in FIG. 3, SDN manager 180 may detect a predetermined event based on first performance metric information associated with FLOW1 191. Any suitable "predetermined event" may be detected, such as a performance issue, etc. In the example in FIG. 2, processing entity 201 may be deployed to receive (e.g., using collector 202) and process (e.g., using analyzer 203) performance metric information from hosts 110A-C. Based on first performance metric information received from host-A 110A (see 231) and/or host-B 110B (see 232), processing entity 201 (e.g., third party tool) may report (see 240) to SDN manager 180 that a performance threshold (e.g., maximum latency) is not satisfied.

At 340 in FIG. 3, in response detecting the predetermined event, SDN manager 180 may activate a second set of checkpoints (see 212 in FIG. 2) by instructing host-A 110A and/or host-B 110B to monitor FLOW1 191 using the second set of checkpoints. As will be discussed further below, block 340 may involve generating and sending control information to cause host-A 110A (see 251) and/or host-B 110B (see 252) to collect second performance metric information associated with FLOW1 191. See also 260 in FIG. 2 where a subsequent FLOW1 191 is monitored using first set 211 and second set 212, which are both activated. Any suitable number (M≥1) of checkpoints may be included in second set 212.

As will be discussed using FIG. 4 to FIG. 7, examples of the present disclosure may be implemented to measure end-to-end latency (i.e., first performance metric information 231/232) for FLOW1 191 using first set 211 that includes VNIC1 151 on host-A 110A and VNIC2 152. Once a latency-related performance issue is detected, second set 212 that includes additional checkpoints (e.g., DFWs 171-172) may be activated to provide latency measurement with a higher granularity.

To facilitate troubleshooting of the performance issue, second performance metric information 271/272 may include an inter-checkpoint metric value (e.g., latency) that is measured between one checkpoint (e.g., VNIC1 151) in first set 211, and another checkpoint (e.g., DFW1 171) in second set 212. Although latency will be used as an example in the following, it should be understood that any alternative and/or additional performance metric information may be considered. In practice, additional sets (i.e., not limited to two sets 211-212) may be configured. For example, a first set may be automatically activated once packet flow monitoring is triggered. A second set is activated when a performance threshold (e.g., latency threshold=100 ms) is not satisfied, while a third set is activated when a further performance threshold (e.g., latency threshold=200 ms) is not satisfied, and so on. In the following, various examples will be discussed using FIGS. 4-7.

Activation of First Set

Figure 4:
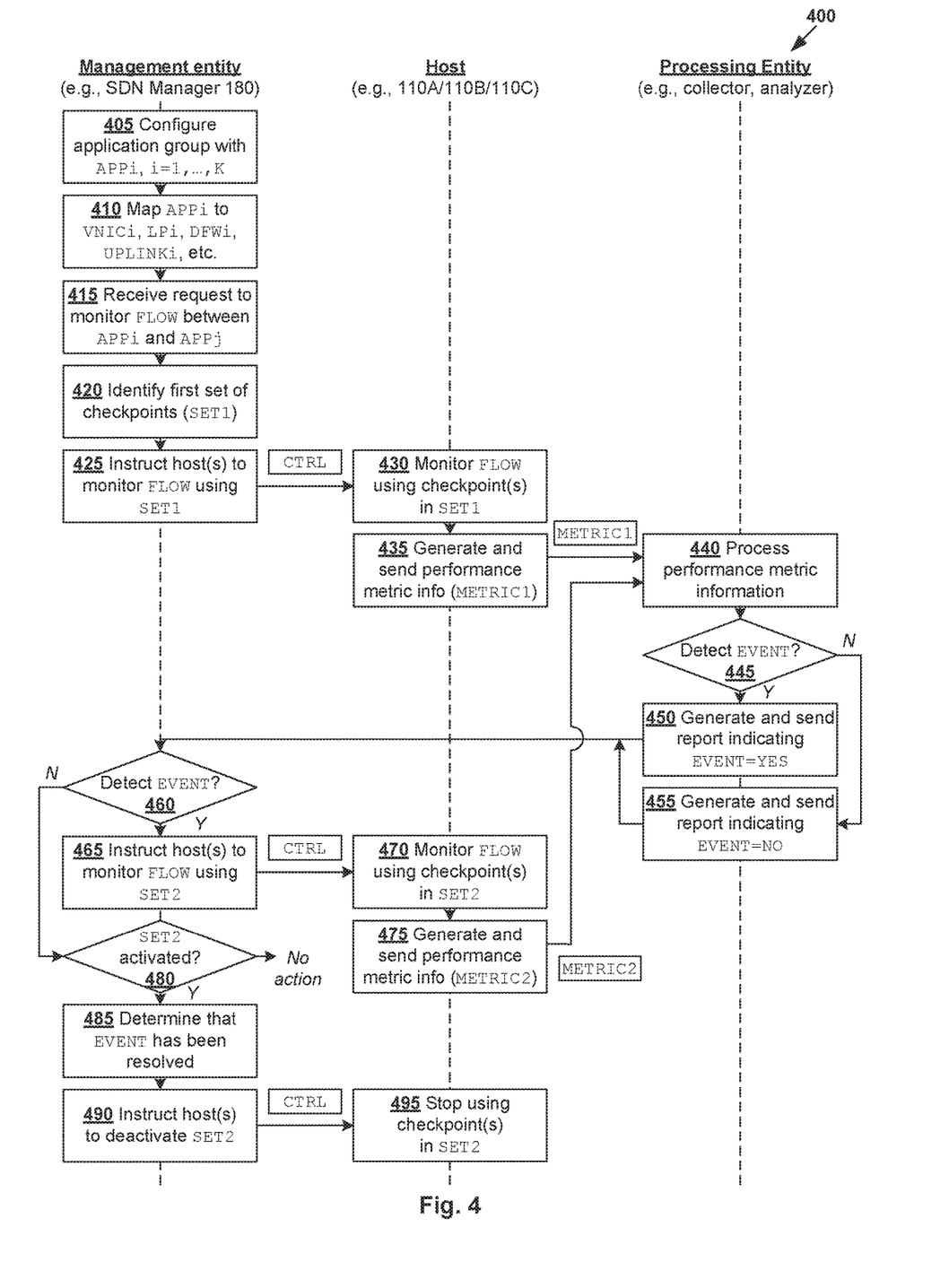
FIG. 4 is a flowchart of an example detailed process for adaptive packet flow monitoring in an SDN environment.
Figure 5:
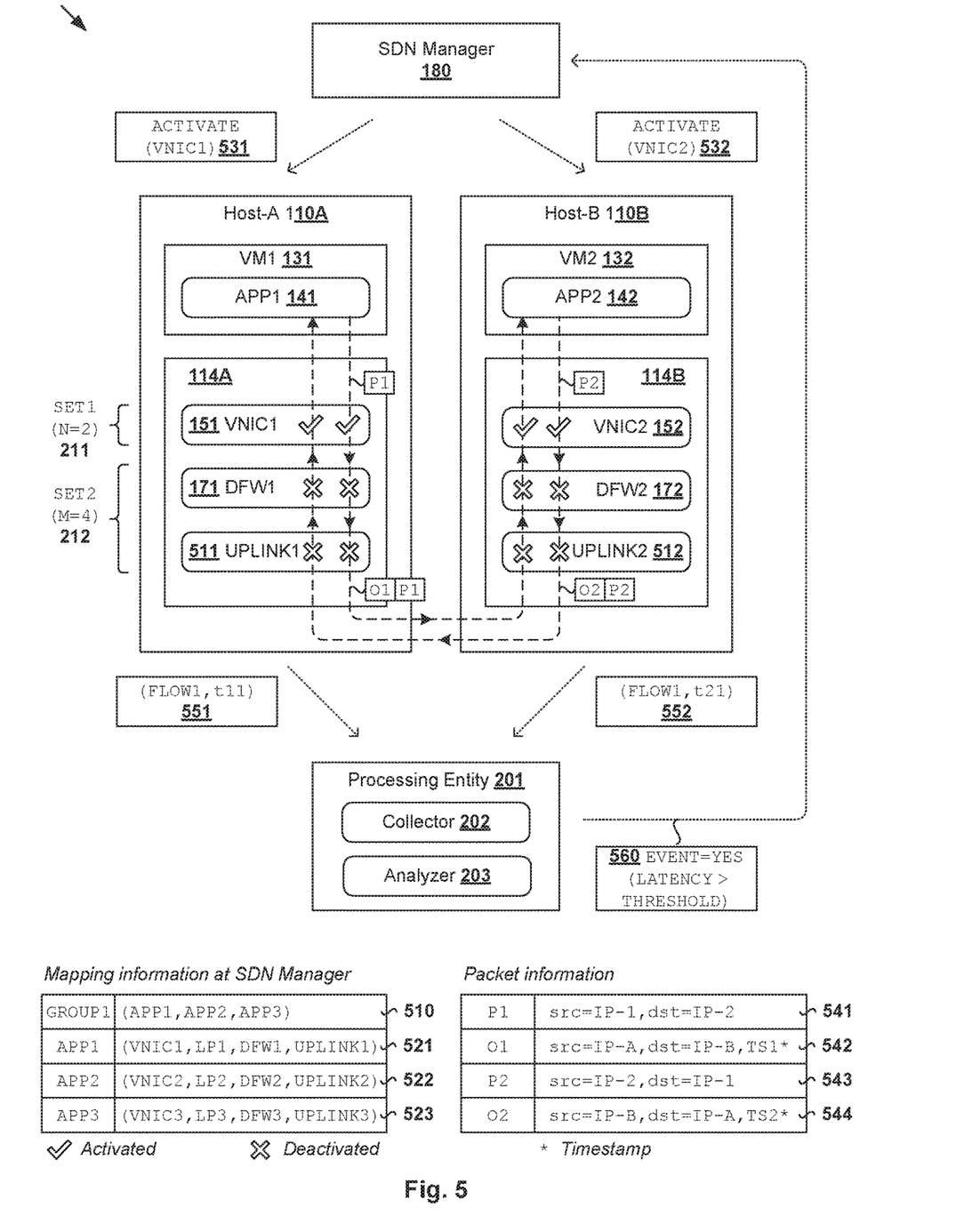
FIG. 5 is a schematic diagram illustrating an example activation of a first set of checkpoints during adaptive packet flow monitoring in an SDN environment.
Figure 6:
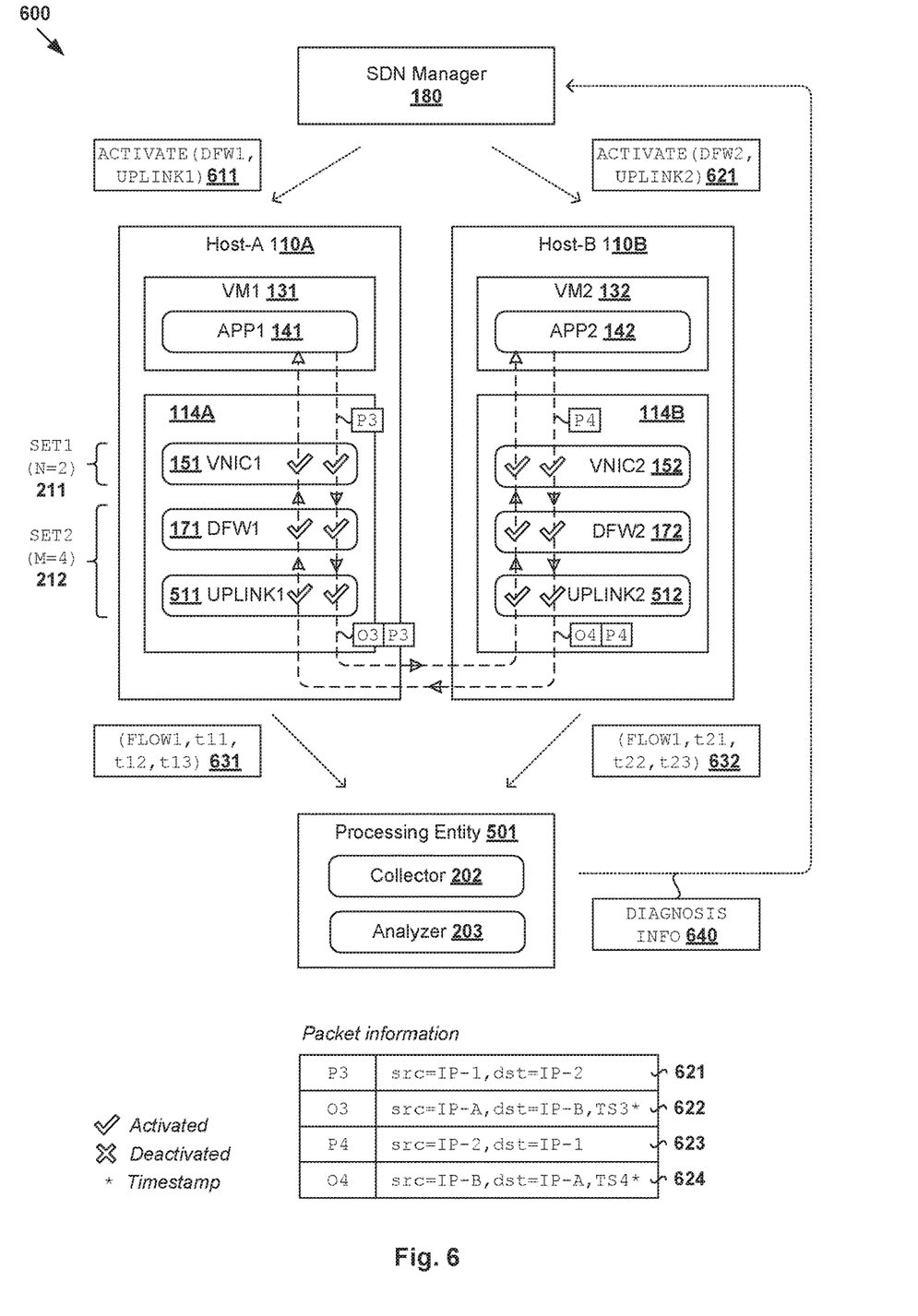
FIG. 6 is a schematic diagram illustrating an example activation of a second set of checkpoints during adaptive packet flow monitoring in an SDN environment.

FIG. 4 is a flowchart of example process 400 of adaptive packet flow monitoring in SDN environment 100. Example process 400 may include one or more operations, functions, or actions illustrated at 405 to 495. The various operations, functions or actions may be combined into fewer blocks, divided into additional blocks, and/or eliminated depending on the desired implementation. Example process 400 may be performed by any suitable network management entity 180/184. FIG. 5 is a schematic diagram illustrating example activation 500 of a first set of checkpoints during adaptive packet flow monitoring in an SDN environment.

At 405 in FIG. 4, an application group may be configured using any suitable interface supported by SDN manager 180, such as graphical user interface (GUI), command-line interface (CLI), application programming interface (API) calls, etc. An application group may include N members that are each denoted as APPi, where i=1, . . . , K. In the example in FIG. 5, GROUP1 (see 510) has K=3 members, i.e., APP1 141 executed by VM1 131, APP2 142 by VM2 132 and APP3 143 by VM3 133.

At 410 in FIG. 4, SDN manager 180 performs application discovery to map each member (APPi) in GROUP1 510 to associated component(s) that may be used as checkpoint(s), such as a corresponding logical port LPi, virtual network adapter VNICi, etc. Any alternative and/or additional components may be discovered, such as distributed firewall engine DFWi, uplink interface UPLINKi, etc. In practice, SDN manager 180 may generate mapping information based on control information obtained from SDN controller 184 and/or hosts 110A-C.

Referring to 521 in FIG. 5, APP1 141 may be mapped to (VNIC1, LP1, DFW1, UPLINK1), where "VNIC1" identifies VNIC1 151, "LP1" identifies LP1 161, and "DFW1" identifies DFW1 171. Further at 522-523, APP2 142 may be mapped to (VNIC2, LP2, DFW2, UPLINK2), and APP3 143 to (VNIC3, LP3, DFW3, UPLINK3). "UPLINK1" (see 511), "UPLINK2" (see 512) and "UPLINK3" (not shown) may identify uplink interfaces or ports implemented by respective hypervisors 114A-C. Depending on the desired implementation, uplink interface 511/512 may represent a logical interface between virtual switch 115A/115B and physical NIC 124A/124B.

At 415 and 420 in FIG. 4, in response to receiving a request to monitor a packet flow between a pair of applications, SDN manager 180 may identify a first set of checkpoints based on mapping information 521-523. At 425 in FIG. 4, SDN manager 180 may activate the first set of checkpoints by instructing the relevant hosts to perform packet flow monitoring using the first set of checkpoints. In practice, a default size (e.g., N=2 in FIG. 5) may be configured for the first set.

In the example in FIG. 5, a monitoring session is configured for FLOW1 191 between APP1 141 of VM1 131 and APP2 142 of VM2 132 in FIGS. 1-2. Based on mapping information 521/522, two checkpoints in the form of VNIC1 151 and VNIC2 152 may be included in first set 211. Next, SDN manager 180 may generate and send control information to instruct host-A 110A (see 531) to monitor FLOW1 191 using VNIC1 151, and host-B 110B (see 532) to monitor FLOW1 191 using VNIC2 152.

At 430 in FIG. 4, in response to receiving control information 531/532, host 110A/110B monitors FLOW1 191 using associated checkpoints in first set 211. In practice, block 430 may involve performing an action when a packet belonging to FLOW1 191 is detected at a particular checkpoint. In the example in FIG. 5, the "action" may be collecting performance metric information associated with FLOW1 191. At 435 in FIG. 4, hosts 110A-B generate and send first performance metric information 551/552 (labelled "METRIC1") to processing entity 201 (e.g., collector 202).

As discussed using FIG. 2, any suitable performance metric information may be collected, such as latency (shown in FIG. 5), throughput, packet loss, jitter, number of transmitted or received units of data (e.g., bytes), and number of packets transmitted or received, any combination thereof, etc. For example, latency may refer generally to the time required to transmit a packet belonging to the flow from a sender to a recipient, such as round trip time (RTT), one-way latency, etc. Throughput may refer generally to the amount of data being sent from the sender to the recipient, such as the quantity of data per unit of time. Packet loss may refer generally to the number of packets lost per a fixed number (e.g., 100) of packets sent. Jitter may refer generally to a variance in latency over time. The number of packets transmitted or received may be used to calculate a packet drop rate between a pair of checkpoints. For example, if the number of packets received by a source checkpoint (e.g., VNIC1 151) is P1 and the number of packets transmitted by a destination checkpoint (e.g., VNIC2 152) is P2, the difference (P1–P2) may represent the number of dropped packets. In this case, the predetermined event may be configured to be (P1–P2) exceeding a particular threshold.

In the example in FIG. 5, host-A 110A and host-B 110B may be configured to measure packet latency at respective VNIC1 151 and VNIC2 152. Referring to 541-542, an encapsulated packet with an outer header (O1) and an inner packet (P1) from VM1 131 to VM2 132 may be detected. The inner packet (P1) is addressed from source=IP-1 associated with VM1 131 to destination=IP-2 associated with VM2 132. The outer header (O1) is addressed from source=IP-A associated with a source VTEP at hypervisor-A 114A to destination=IP-B associated with a destination VTEP at hypervisor-B 114B. In response to detecting the packet, host-B 110B may send metric information= (FLOW1, t21) to processing entity 201. Here, "t21" is the end-to-end latency or time spent by for FLOW1 191 between source VNIC1 151 and destination VNIC2 152. See 552 in FIG. 5.

Referring to 543-544 (reverse traffic), an encapsulated packet with an outer header (O2) and an inner packet (P2) from VM2 132 to VM1 131 may be detected. The inner packet (P2) is addressed from source=IP-2 to destination=IP-1. The outer header (O2) is addressed from source=IP-B associated with a source VTEP at hypervisor-B 114B to destination=IP-A associated with a destination VTEP at hypervisor-A 114A. In response to detecting the packet, host-A 110A may send metric information= (FLOW1, t11) to processing entity 201. Here, "t11" is the end-to-end latency or time spent by for FLOW1 191 between source VNIC2 152 and destination VNIC1 151. See 551 in FIG. 5.

In practice, latency measurement may be performed based on timestamp information in packets belonging to FLOW1 191. For example, first outer header (O1) is timestamped with "TS1" (see 542) and second outer header (O2) with "TS2" (see 544). To calculate end-to-end latency, host 110A/110B may perform a subtraction operation to calculate the difference between (a) the timestamp information and (b) a current time at which the packet is detected at a checkpoint. The timestamp information may be configured according to any suitable overlay network protocol (e.g., GENEVE). Depending on the desired implementation, a particular metric value may be a time average value (i.e., average of latency measurements over a period of time), etc.

Referring to FIG. 4 again, at 450, processing entity 201 (e.g., collector 202) collates performance metric information 551-552 from hosts 110A-B. Next, at 445, processing entity 201 (e.g., analyzer 203) analyzes performance metric information 551-552 to detect a predetermined event. In practice, the predetermined event may be specified in the request received at block 415, or previously configured either manually (e.g., by a network administrator) or programmatically. In the example in FIG. 5, block 445 may involve identifying any performance issue, such as whether a performance threshold is satisfied. If not satisfied (see 450), a report indicating the performance issue (e.g., latency threshold exceeded) may be generated and sent to SDN manager 180. See also 560 in FIG. 5. In practice, the performance threshold (e.g., maximum latency) may be configured manually by a network administrator, programmatically (e.g., based on service level agreements), etc.

Activation of Second Set

Once a predetermined event is identified, second set 212 may be activated to increase the number of checkpoints. This way, the granularity of the performance metric information generated by hosts 110A-B may be improved to facilitate troubleshooting. For example, under normal operating conditions, users are usually interested in end-to-end latency measurements. Once there is a performance issue, however, more detailed measurements may be collected to identify the source of the issue. Some examples will be discussed using FIG. 6, which is a schematic diagram illustrating example activation 600 of a second set of checkpoints during adaptive packet flow monitoring in an SDN environment.

At 460 and 465 in FIG. 4, in response to detecting a predetermined event based on a report (see 560 in FIG. 5) from processing entity 201, SDN manager 180 may identify and activate second set 212 of checkpoints with M=4 members. In particular, based on mapping information 521-522 in FIG. 5, second set 212 includes (DFW1 171, UPLINK1 511) supported by host-A 110A, and (DFW2 172, UPLINK2 512) supported by host-B 110B. As such, SDN manager 180 proceeds to generate and send control information to instruct host-A 110A and host-B 110B to perform packet flow monitoring for FLOW1 191 using second set 212. See 611-612 in FIG. 6.

Once activated, FLOW1 191 may be monitored using both first set 211 and second set 212 (i.e., a total of six checkpoints). Referring to 621-622, an encapsulated packet with an outer header (O3), and an inner packet (P3) from VM1 131 to VM2 132 may be detected. The inner packet (P3) is addressed from source=IP-1 to destination=IP-2. The outer header (O3) is timestamped with "T53" and addressed from source=IP-A to destination=IP-B. In response to detecting the packet, host-B 110B may send second metric information=(FLOW1, t21, t22, t23) to processing entity 201. Here, "t21" may be the inter-checkpoint latency between VNIC2 152 and DFW2 172, "t22" between DFW2 172 and UPLINK2 512, and "t23" between UPLINK1 511 and UPLINK2 512. See corresponding 470-475 and 632 in FIG. 6.

Referring to 623-624 (reverse traffic), an encapsulated packet with an outer header (O4) and an inner packet (P4) from VM2 132 to VM1 131 may be detected. The inner packet (P4) is addressed from source=IP-2 to destination=IP-1. The outer header (O4) is timestamped with "T54" and addressed from source=IP-B to destination=IP-A. In response to detecting the packet, host-A 110A may send metric information=(FLOW1, t11, t12, t13) to processing entity 201. Here, "t11" may be the inter-checkpoint latency between VNIC1 151 and DFW1 171, "t12" the latency between DFW1 171 and UPLINK1 511, and "t13" between UPLINK1 511 and UPLINK2 512. See 631 in FIG. 6.

Next, processing entity 201 may process (FLOW1, t11, t12, t13) from host-A 110A and (FLOW1, t21, t22, t23) from host-B 110B to identify a source of the performance issue. For example, analyzer 203 may identify any suspicious or problematic checkpoints that cause the extra latency. In the example in FIG. 6, SDN manager 180 may receive diagnosis information 640 from processing entity 201 and report to the user. Alternatively or additionally, the diagnosis to identify suspicious or problematic checkpoints may be performed by SDN manager 180.

Once it is determined that the performance issue is resolved, SDN manager 180 may deactivate second set 212 by instructing host-A 110A to stop using DFW1 171 and UPLINK1 511, as well as host-B 110B to stop using DFW2 172 and UPLINK2 512 as checkpoints. SDN manager 180 may determine that the performance issue is resolved based on a report from processing entity 201. See 455-460 (i.e., no performance issue), and 480-495 (i.e., deactivation) in FIG. 4. Alternatively or additionally, SDN manager 180 may perform the deactivation based on a manual configuration by a network administrator.

Deactivation of Second Set

Figure 7:
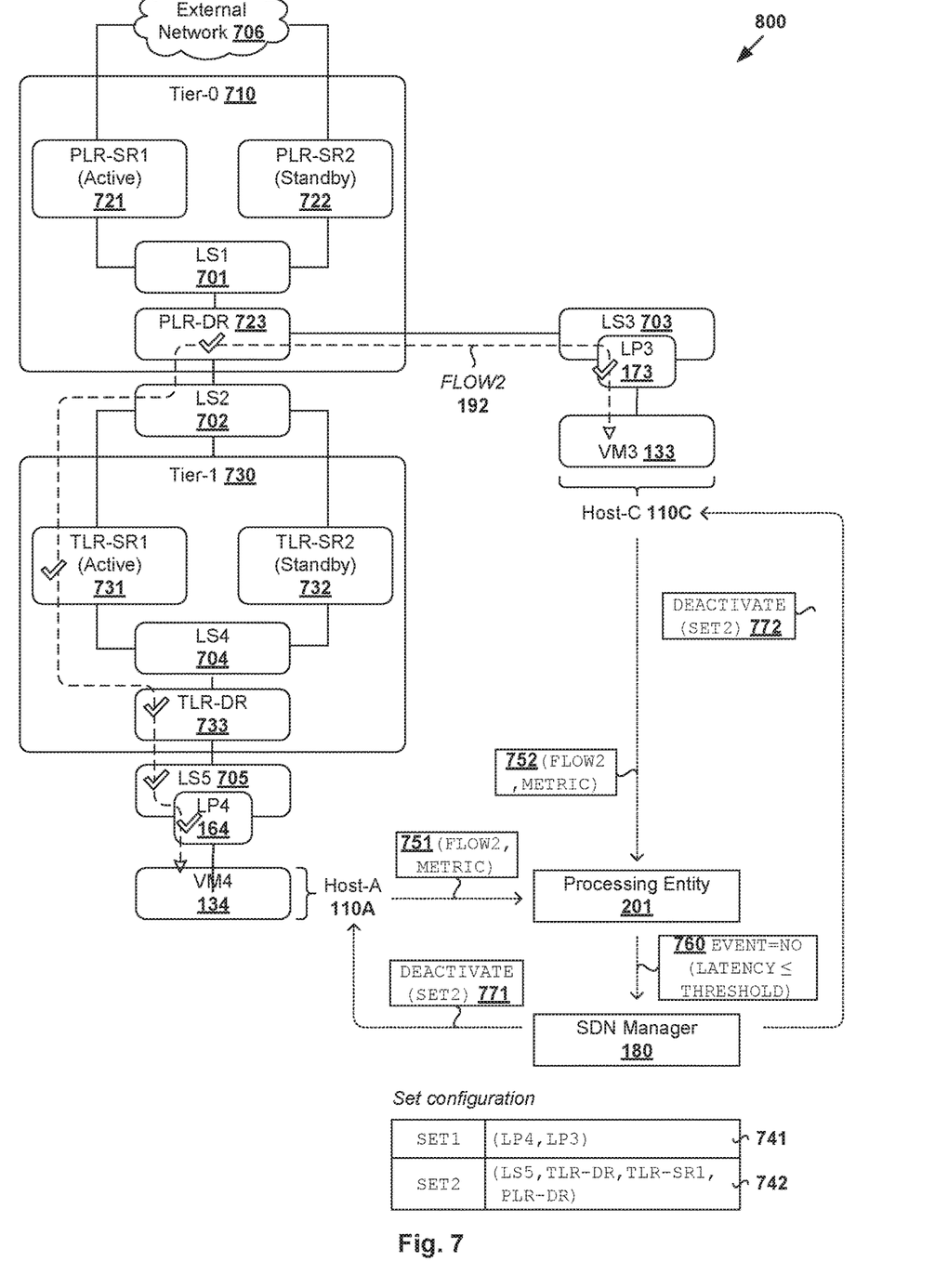
FIG. 7 is a schematic diagram illustrating an example deactivation of a second set of checkpoints during adaptive packet flow monitoring in an SDN environment.

To illustrate the deactivation process and other types of checkpoints, FIG. 7 is a schematic diagram illustrating example deactivation 700 of a second set of checkpoints during adaptive packet flow monitoring in SDN environment 100. In this case, a monitoring session is configured for FLOW2 192 between APP4 144 of VM4 134 and APP3 143 of VM3 133 in FIG. 1. FIG. 7 shows a two-tier topology that includes an upper tier (see "tier-0" 710) associated with a provider logical router (PLR) and a lower tier (see "tier-1" 730) associated with a tenant logical router (TLR). Each tier may include both DRs and SRs, or DRs and SRs on the upper tier but only DRs at the lower tier. As such, a logical router may be categorized as one of the following types: TLR-DR, TLR-SR, PLR-DR and PLR-SR.

Using the example in FIG. 1, logical DRs (e.g., TLR-DR and PLR-DR) may be implemented collectively by DR instances 117A-C at respective hosts 110A-C, and represented internally using routing tables 118A-C at respective DR instances 117A-C. The multi-tiered topology enables both the provider (e.g., data center owner) and tenant (e.g., data center tenant, often there are multiple tenants) to control their services and policies. Each tenant has full control over its TLR policies, whereas common PLR policies may be applied to different tenants. Referring to upper tier 710 in FIG. 7, two SRs (i.e., PLR-SR1 721 and PLR-SR2 722) are deployed and connected to one DR (i.e., PLR-DR 723) via transit logical switch LS1 701. Upper tier 710 connects lower tier 730 (via LS2 702) to external network 706.

PLR-SR1 721 is associated with role=primary and usually operates in state=ACTIVE, while PLR-SR2 722 is associated with role=secondary and state=STANDBY. During a failover, PLR-SR2 722 transitions from STANDBY to ACTIVE.

Referring to lower tier 730 in FIG. 7, two SRs (i.e., TLR-SR1 731 and TLR-SR2 732) are deployed and connected to one DR (i.e., TLR-DR 733) via transit logical switch LS4 704. Upper tier 730 connects lower tier 730 to external network 706. TLR-SR1 731 is associated with role=primary and usually operates in state=ACTIVE, while TLR-SR2 732 is associated with role=secondary and state=STANDBY. During a failover, TLR-SR2 732 transitions from STANDBY to ACTIVE. As such, FLOW2 192 between VM4 134 and VM3 133 travels along a datapath that includes TLR-DR 733, TLR-SR 731/732, PLR-DR 723 and logical switches 702-705.

According to blocks 415-435 in FIG. 4, SDN manager 180 may activate first set 741 that includes two checkpoints, i.e., LP4 164 connected to VM4 134 and LP3 163 connected to VM3 133. According to blocks 440-475 in FIG. 4, SDN manager 180 may activate second set 742 that includes additional checkpoints, i.e., LS5 705, TLR-DR 733, TLR-SR1 761, PLR-DR 723. Based on second metric information 751-752 collected using both sets 741-742, processing entity 201 may generate and send a report (see 760) to SDN manager 180 to indicate that there is no performance issue (e.g., latency threshold is satisfied).

According to blocks 460, 480-495 in FIG. 4, in response to receiving report 730, SDN manager 180 may determine that the previous performance issue has been resolved. Since second set 742 is currently activated, SDN manager 180 instructs host-A 110A (see 771) and host-B 110B (see 772) to perform deactivation. Once deactivated, FLOW2 192 will be monitored using first set 741 only.

Although shown as a separate entity, processing entity 201 may be implemented as part of network management entity 180/184. In this case, blocks 440-455 in FIG. 4 may be performed by network management entity 180/184. Further, instead of sending metric information to processing entity 201, hosts 110A-B may send the information to network management entity 180/184 for processing, or subsequent transmission to processing entity 201. Collector 202 and analyzer 203 may be implemented by the same physical or virtual machine(s), or different ones. A particular checkpoint (e.g., PLR-SR or TLR-SR) may be implemented by an alternative or additional host.

Container Implementation

Although explained using VMs 131-136, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 7, container technologies may be used to run various containers inside respective VMs 131-136. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, a computer system capable of acting as a network management entity may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network management entity to perform adaptive packet flow monitoring in a software-defined networking (SDN) environment that includes the network management entity, a first host and a second host, wherein the method comprises:
receiving a request to monitor a packet flow traveling along a datapath between a first virtualized computing instance supported by the first host and a second virtualized computing instance supported by the second host;
activating a first set of checkpoints by instructing the first host or the second host, or both, to monitor the packet flow using the first set of checkpoints, wherein at least one of the checkpoints in the first set of checkpoints is supported by either the first host or the second host, and the first set of checkpoints correspond to a first set of components located on the datapath; and
in response to detecting a predetermined event based on first performance metric information associated with the packet flow,
activating a second set of checkpoints by instructing the first host or the second host, or both, to monitor the packet flow using the second set of checkpoints and generating and sending second control information to cause the first host or the second host, or both, to collect second performance metric information that includes an inter-checkpoint metric measured between one checkpoint in the first set of checkpoints and another checkpoint in the second set of checkpoints, wherein
at least one of the checkpoints in the second set of checkpoints is supported by either the first host or the second host, and the second set of checkpoints correspond to a second set of components located on the datapath, and
after having activated the first set of checkpoints and the second set of checkpoints, the packet flow is monitored by the activated first set of checkpoints and the activated second set of checkpoints.

2. The method of claim 1, wherein activating the first set of checkpoints comprises:
generating and sending first control information to cause the first host or the second host, or both, to collect the first performance metric information that measures one or more of the following: latency, throughput, packet loss, jitter, number of transmitted or received units of data, and number of packets transmitted or received.

3. The method of claim 1, wherein detecting the predetermined event comprises:
receiving, from a processing entity, a report indicating that a performance threshold is not satisfied based on the first performance metric information received by the processing entity from the first host, the second host, or both.

4. The method of claim 1, wherein the method further comprises:
in response to detecting the predetermined event has been resolved, deactivating the second set of checkpoints by instructing the first host or the second host, or both, to stop monitoring the packet flow using the second set of checkpoints.

5. The method of claim 4, wherein detecting that the predetermined event has been resolved comprises:
receiving, from a processing entity, a report indicating that a performance threshold is satisfied based on second performance metric information collected using at least the second set of checkpoints.

6. The method of claim 1, wherein the method further comprises:
mapping a first application implemented by the first virtualized computing instance to at least one checkpoint in the first set of checkpoints or the second set of checkpoints; and
mapping a second application implemented by the second virtualized computing instance to at least one checkpoint in the first set of checkpoints or the second set of checkpoints.

7. A non-transitory computer-readable storage medium that includes a set of instructions which, in response to execution by a processor of a computer system, cause the processor to perform a method of adaptive packet flow monitoring in a software-defined networking (SDN) environment that includes the network management entity, a first host and a second host, wherein the method comprises:
receiving a request to monitor a packet flow traveling along a datapath between a first virtualized computing instance supported by the first host and a second virtualized computing instance supported by the second host;
activating a first set of checkpoints by instructing the first host or the second host, or both, to monitor the packet flow using the first set of checkpoints, wherein at least one of the checkpoints in the first set of checkpoints is supported by either the first host or the second host, and the first set of checkpoints correspond to a first set of components located on the datapath; and
in response to detecting a predetermined event based on first performance metric information associated with the packet flow,
activating a second set of checkpoints by instructing the first host or the second host, or both, to monitor the packet flow using the second set of checkpoints and generating and sending second control information to cause the first host or the second host, or both, to collect second performance metric information that includes an inter-checkpoint metric measured between one checkpoint in the first set of checkpoints and another checkpoint in the second set of checkpoints, wherein
at least one of the checkpoints in the second set of checkpoints is supported by either the first host or the second host, and the second set of checkpoints correspond to a second set of components located on the datapath, and
after having activated the first set of checkpoints and the second set of checkpoints, the packet flow is monitored by the activated first set of checkpoints and the activated second set of checkpoints.

8. The non-transitory computer-readable storage medium of claim 7, wherein activating the first set of checkpoints comprises:
generating and sending first control information to cause the first host or the second host, or both, to collect the first performance metric information that measures one or more of the following: latency, throughput, packet loss, jitter, number of transmitted or received units of data, and number of packets transmitted or received.

9. The non-transitory computer-readable storage medium of claim 7, wherein detecting the predetermined event comprises:

receiving, from a processing entity, a report indicating that a performance threshold is not satisfied based on the first performance metric information received by the processing entity from the first host, the second host, or both.

10. The non-transitory computer-readable storage medium of claim 7, wherein the method further comprises:
in response to detecting the predetermined event has been resolved, deactivating the second set of checkpoints by instructing the first host or the second host, or both, to stop monitoring the packet flow using the second set of checkpoints.

11. The non-transitory computer-readable storage medium of claim 10, wherein detecting that the predetermined event has been resolved comprises:
receiving, from a processing entity, a report indicating that a performance threshold is satisfied based on second performance metric information collected using at least the second set of checkpoints.

12. The non-transitory computer-readable storage medium of claim 7, wherein the method further comprises:
mapping a first application implemented by the first virtualized computing instance to at least one checkpoint in the first set of checkpoints or the second set of checkpoints; and
mapping a second application implemented by the second virtualized computing instance to at least one checkpoint in the first set of checkpoints or the second set of checkpoints.

13. A computer system configured to perform adaptive packet flow monitoring in a software-defined networking (SDN) environment that includes the network management entity, a first host and a second host, wherein the computer system comprises:
a processor; and
a non-transitory computer-readable medium having stored thereon instructions that, when executed by the processor, cause the processor to:
receive a request to monitor a packet flow traveling along a datapath between a first virtualized computing instance supported by the first host and a second virtualized computing instance supported by the second host;
activate a first set of checkpoints by instructing the first host or the second host, or both, to monitor the packet flow using the first set of checkpoints, wherein at least one of the checkpoints in the first set of checkpoints is supported by either the first host or the second host, and the first set of checkpoints correspond to a first set of components located on the datapath; and
in response to detecting a predetermined event based on first performance metric information associated with the packet flow,
activate a second set of checkpoints by instructing the first host or the second host, or both, to monitor the packet flow using the second set of checkpoints and generating and sending second control information to cause the first host or the second host, or both, to collect second performance metric information that includes an inter-checkpoint metric measured between one checkpoint in the first set of checkpoints and another checkpoint in the second set of checkpoints, wherein
at least one of the checkpoints in the second set of checkpoints is supported by either the first host or the second host, and the second set of checkpoints correspond to a second set of components located on the datapath, and
after having activated the first set of checkpoints and the second set of checkpoints, the packet flow is monitored by the activated first set of checkpoints and the activated second set of checkpoints.

14. The computer system of claim 13, wherein the instructions for activating the first set of checkpoints cause the processor to:
generate and send first control information to cause the first host or the second host, or both, to collect the first performance metric information that measures one or more of the following: latency, throughput, packet loss, jitter, number of transmitted or received units of data, and number of packets transmitted or received.

15. The computer system of claim 13, wherein the instructions for detecting the predetermined event cause the processor to:
receive, from a processing entity, a report indicating that a performance threshold is not satisfied based on the first performance metric information received by the processing entity from the first host, the second host, or both.

16. The computer system of claim 13, wherein the instructions further cause the processor to:
in response to detecting the predetermined event has been resolved, deactivate the second set of checkpoints by instructing the first host or the second host, or both, to stop monitoring the packet flow using the second set of checkpoints.

17. The computer system of claim 16, wherein the instructions for detecting that the predetermined event has been resolved cause the processor to:
receive, from a processing entity, a report indicating that a performance threshold is satisfied based on second performance metric information collected using at least the second set of checkpoints.

18. The computer system of claim 13, wherein the instructions further cause the processor to:
map a first application implemented by the first virtualized computing instance to at least one checkpoint in the first set of checkpoints or the second set of checkpoints; and
map a second application implemented by the second virtualized computing instance to at least one checkpoint in the first set of checkpoints or the second set of checkpoints.

* * * * *